US012472131B2

(12) United States Patent
Miyazawa et al.

(10) Patent No.: US 12,472,131 B2
(45) Date of Patent: Nov. 18, 2025

(54) INFLAMMATION-SUPPRESSING AGENT

(71) Applicant: Shiseido Company, Ltd., Tokyo (JP)

(72) Inventors: Kazuyuki Miyazawa, Tokyo (JP); Renaud Gillet, Tokyo (JP); Bianca Mccarthy, Tokyo (JP); Tetsuya Kanemaru, Tokyo (JP); Chieko Mizumoto, Tokyo (JP); Tomoko Onodera, Tokyo (JP); Tomomi Narita, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 735 days.

(21) Appl. No.: 17/796,580

(22) PCT Filed: Jan. 29, 2021

(86) PCT No.: PCT/JP2021/003391
§ 371 (c)(1),
(2) Date: Jul. 29, 2022

(87) PCT Pub. No.: WO2021/153783
PCT Pub. Date: Aug. 5, 2021

(65) Prior Publication Data
US 2023/0074242 A1 Mar. 9, 2023

(30) Foreign Application Priority Data
Jan. 31, 2020 (JP) ................................. 2020-015815

(51) Int. Cl.
*A61K 8/27* (2006.01)
*A61Q 17/04* (2006.01)

(52) U.S. Cl.
CPC ............... *A61K 8/27* (2013.01); *A61Q 17/04* (2013.01)

(58) Field of Classification Search
None
See application file for complete search history.

(56) References Cited

U.S. PATENT DOCUMENTS

| | | | |
|---|---|---|---|
| 2,613,206 A | 10/1952 | Caldwell |
| 3,577,537 A | 5/1971 | Howe |
| 4,374,796 A | 2/1983 | Ogasawara et al. |
| 5,221,534 A | 6/1993 | Des Lauriers et al. |
| 5,316,767 A | 5/1994 | Hara et al. |
| 5,612,324 A | 3/1997 | Guang Lin et al. |
| 5,998,789 A | 12/1999 | Kovalsky et al. |
| 6,207,174 B1 | 3/2001 | Hineno et al. |
| 6,972,129 B1 | 12/2005 | Ogawa et al. |
| 2002/0106518 A1 | 8/2002 | Inaki et al. |
| 2003/0180535 A1 | 9/2003 | Horino et al. |
| 2005/0158257 A1 | 7/2005 | Ogawa et al. |
| 2006/0140889 A1 | 6/2006 | Houtzager et al. |
| 2006/0275231 A1 | 12/2006 | Dumousseaux |
| 2007/0141018 A1 | 6/2007 | Courtois et al. |
| 2007/0154426 A1 | 7/2007 | Hansen et al. |
| 2007/0243520 A1 | 10/2007 | Fujimura et al. |
| 2008/0183250 A1 | 7/2008 | Tanojo et al. |
| 2008/0213198 A1 | 9/2008 | Lintner et al. |
| 2009/0220627 A1 | 9/2009 | Hasegawa et al. |
| 2009/0270298 A1 | 10/2009 | Compain |
| 2010/0003202 A1 | 1/2010 | Matsumoto et al. |
| 2010/0228181 A1 | 9/2010 | Laboureau et al. |
| 2010/0247693 A1 | 9/2010 | Marini |
| 2010/0272663 A1 | 10/2010 | Pierre et al. |
| 2011/0033400 A1 | 2/2011 | Ehlis et al. |
| 2011/0046538 A1 | 2/2011 | Laboureau et al. |
| 2012/0156149 A1 | 6/2012 | Yamaguchi et al. |
| 2012/0328719 A1 | 12/2012 | Iriyama et al. |
| 2013/0079368 A1 | 3/2013 | Omura et al. |
| 2015/0239941 A1 | 8/2015 | Pottecher |
| 2016/0160347 A1 | 6/2016 | Liu et al. |
| 2016/0338943 A1 | 11/2016 | Saxena et al. |
| 2017/0009024 A1 | 1/2017 | Kudo |
| 2017/0027827 A1 | 2/2017 | Ota et al. |
| 2017/0042312 A1 | 2/2017 | Shih |
| 2017/0065498 A1 | 3/2017 | Gershon et al. |
| 2017/0172888 A1 | 6/2017 | Tashiro et al. |
| 2018/0311117 A1 | 11/2018 | Zeng et al. |
| 2020/0093712 A1 | 3/2020 | Uchiyama et al. |
| 2020/0113793 A1 | 4/2020 | Sako et al. |
| 2020/0289400 A1 | 9/2020 | Nakajima et al. |
| 2020/0297598 A1 | 9/2020 | Koizumi et al. |

(Continued)

FOREIGN PATENT DOCUMENTS

| | | |
|---|---|---|
| CN | 102048654 A | 5/2011 |
| CN | 105055251 A | 11/2015 |

(Continued)

OTHER PUBLICATIONS

Feng Juqin et al., "Chinese Cosmetic Therapy Techniques," China Press of Traditional Chinese Medicine, Aug. 31, 2014, p. 35-36.
Zhu Ping et al., "LED Light Therapy Application and Development," China Science and Technology Press, Aug. 31, 2017, p. 41.
U.S. Appl. No. 17/601,252, filed Apr. 3, 2020, Ito et al.
U.S. Appl. No. 17/601,333, filed Apr. 3, 2020, Sugihara et al.
U.S. Appl. No. 17/601,317, filed Apr. 3, 2020, Ito et al.
U.S. Appl. No. 17/601,347, filed Apr. 3, 2020, Okuyama et al.
U.S. Appl. No. 17/601,262, filed Apr. 3, 2020, Yoshida et al.
U.S. Appl. No. 17/601,331, filed Apr. 3, 2020, Okuyama et al.
U.S. Appl. No. 17/601,341, filed Apr. 1, 2020, Miyazawa et al.
U.S. Appl. No. 17/601,704, filed Apr. 3, 2020, Ito et al.
U.S. Appl. No. 17/796,577, filed Jan. 29, 2021, Miyazawa et al.
U.S. Appl. No. 17/796,578, filed Jan. 29, 2021, Miyazawa et al.
U.S. Appl. No. 17/796,584, filed Jan. 29, 2021, Miyazawa et al.
Kato, Toshimitsu, "Utilization of Spirulina blue colorant: Especially for frozen desserts and drinks," New Food Industry, 1987, 29(3):17-21, with English machine translation.

(Continued)

Primary Examiner — Nannette Holloman
(74) Attorney, Agent, or Firm — Foley & Lardner LLP

(57) ABSTRACT

An inflammation inhibiting agent was provided with.
An inflammation inhibiting agent comprising a wavelength conversion substance as an active ingredient; a composition and a product comprising the inflammation inhibiting agent; and a method for inhibiting inflammation of skin using thereof were provided with. The present invention can exhibit a desirable effect on skin by effectively making use of ultraviolet light to inhibit inflammation in skin cells.

11 Claims, 4 Drawing Sheets

Specification includes a Sequence Listing.

(56) References Cited

U.S. PATENT DOCUMENTS

| | | |
|---|---|---|
| 2020/0308482 A1 | 10/2020 | Ishikawa et al. |
| 2021/0228472 A1 | 7/2021 | Osawa et al. |
| 2022/0175639 A1 | 6/2022 | Okuyama et al. |

FOREIGN PATENT DOCUMENTS

| | | |
|---|---|---|
| CN | 106309272 A | 1/2017 |
| CN | 105055251 B1 | 6/2018 |
| CN | 113631144 A | 11/2021 |
| EP | 0 905 206 A2 | 3/1999 |
| EP | 1 090 974 A1 | 4/2001 |
| EP | 1 296 639 A1 | 4/2003 |
| GB | 0 639 086 A | 6/1950 |
| JP | 57-060004 B2 | 12/1982 |
| JP | 61-054766 B2 | 11/1986 |
| JP | 62-000408 A | 1/1987 |
| JP | 03-284613 A | 12/1991 |
| JP | 05-117127 A | 5/1993 |
| JP | 07-206651 A | 8/1995 |
| JP | 09-030926 A | 2/1997 |
| JP | 10-265321 A | 10/1998 |
| JP | 11-092688 A | 4/1999 |
| JP | 11-193207 A | 7/1999 |
| JP | 11-222421 A | 8/1999 |
| JP | 11-236315 A | 8/1999 |
| JP | 2001-335442 A | 12/2001 |
| JP | 2002-146238 A | 5/2002 |
| JP | 2002-212033 A | 7/2002 |
| JP | 3303942 B | 7/2002 |
| JP | 2003-061229 A | 2/2003 |
| JP | 2003-212745 A | 7/2003 |
| JP | 2003-261421 A | 9/2003 |
| JP | 3608778 B2 | 1/2005 |
| JP | 2005-041861 A | 2/2005 |
| JP | 2006-022050 A | 1/2006 |
| JP | 2006-282593 A | 10/2006 |
| JP | 2006-316065 A | 11/2006 |
| JP | 2007-055990 A | 3/2007 |
| JP | 2007-056035 A | 3/2007 |
| JP | 2007-084508 A | 4/2007 |
| JP | 2007-517770 A | 7/2007 |
| JP | 2008-037844 A | 2/2008 |
| JP | 4048420 B | 2/2008 |
| JP | 2008-189642 A | 8/2008 |
| JP | 2009-137900 A | 6/2009 |
| JP | 2009-209093 A | 9/2009 |
| JP | 2010-090113 A | 4/2010 |
| JP | 4453995 B2 | 4/2010 |
| JP | 2010-195694 A | 9/2010 |
| JP | 2010-533689 A | 10/2010 |
| JP | 2011-042624 A | 3/2011 |
| JP | 4677250 B | 4/2011 |
| JP | 2011-102270 A | 5/2011 |
| JP | 2012-167088 A | 9/2012 |
| JP | 2012-201660 A | 10/2012 |
| JP | 2013-501104 A | 1/2013 |
| JP | 2013-177356 A | 9/2013 |
| JP | 2015-074623 A | 4/2015 |
| JP | 2015-120682 A | 7/2015 |
| JP | 2015-172071 A | 10/2015 |
| JP | 2016-500052 A | 1/2016 |
| JP | 2016-069325 A | 5/2016 |
| JP | 2017-036277 A | 2/2017 |
| JP | 2017-088719 A | 5/2017 |
| JP | 2017-122075 A | 7/2017 |
| JP | 2017-122076 A | 7/2017 |
| JP | 2017-155062 A | 9/2017 |
| JP | 2017-214565 A | 12/2017 |
| JP | 2018-065780 A | 4/2018 |
| JP | 2018-076277 A | 5/2018 |
| JP | 2018-076308 A | 5/2018 |
| JP | 2018-512064 A | 5/2018 |
| JP | 2018-100258 A | 6/2018 |
| JP | 6361416 B | 7/2018 |
| JP | 2018-131422 A | 8/2018 |
| JP | 6424656 B2 | 11/2018 |
| JP | 2019-043920 A | 3/2019 |
| JP | 2019-108303 A | 7/2019 |
| JP | 2019-137623 A | 8/2019 |
| JP | 2019-167330 A | 10/2019 |
| JP | 2019-178126 A | 10/2019 |
| JP | 2020-066599 A | 4/2020 |
| JP | 2020-183356 A | 11/2020 |
| KR | 10-2019-0005369 A | 1/2019 |
| KR | 20190005369 A | 1/2019 |
| TW | 201216997 A1 | 5/2012 |
| WO | WO-02/00190 A1 | 1/2002 |
| WO | WO-03/099039 A1 | 12/2003 |
| WO | WO-2005/034862 A2 | 4/2005 |
| WO | WO-2011/014783 A1 | 2/2011 |
| WO | WO-2015/166895 A1 | 11/2015 |
| WO | WO-2016/068300 A1 | 5/2016 |
| WO | WO-2016/142129 | 9/2016 |
| WO | WO-2016/160347 A2 | 10/2016 |
| WO | WO-2017/069157 A1 | 4/2017 |
| WO | WO-2017142057 A1 * | 8/2017 ............... A61K 8/25 |
| WO | WO-2018/004006 A1 | 1/2018 |
| WO | WO-2018/062469 A1 | 4/2018 |
| WO | WO-2018/117117 A1 | 6/2018 |
| WO | WO-2019/032059 A1 | 2/2019 |
| WO | WO-2019/065963 A1 | 4/2019 |

OTHER PUBLICATIONS

Sakai Chemical Industry Co., Ltd., "Shining new cosmetic raw material, Inorganic fluorescent powder Lumate series," Fragrance Journal, Jul. 2015, 62-63, with English machine translation.

Sakai Chemical Industry Co., Ltd., Inorganic fluorescent material that emits "beautiful skin color", Lumate, Fragrance Journal, 2018, 46(8):66-67, with English translation.

"Modern Cosmetic Science and Technology (vol. 2)," edited by Qiu Bingyi et al., China Light Industry Press Ltd., Mar. 2016, pp. 1414 and 1415, with English machine translation.

Dejsungkranont et al., "Enhancement of antioxidant activity of C-phycocyanin of Spirulina powder treated with supercritical fluid carbon dioxide," Agriculture and Natural Resources, 2017, 51:347-354.

Du et al., "Visible-to-Ultraviolet Light Conversion: Materials and Applications," Advanced Photonics Research, 2021, 2(2000213):1-20.

English Machine Translation of Chae et al KR20190005369A [online]. Google Patents [retrieved on Sep. 5, 2025]. Retrieved from the internet: <https://patents.google.com/patent/KR20190005369A/en?oq=kr20190005369>. (Year: 2025).

Eriksen, Niels T., "Production of phycocyanin—a pigment with applications in biology, biotechnology, foods and medicine," Applied Microbiology and Biotechnology, 2008, 80(1):1-14.

Estrada-Urbina et al., "Nanoscale Zinc Oxide Particles for Improving the Physiological and Sanitary Quality of a Mexican Landrace of Red Maize." Nanomaterials, Apr. 17, 2018, 8(247):1-12.

Hatano et al., "Monolithic wavelength converter for ultraviolet light by use of a GdxY1-xCa4O(BO3)3 crystal," Applied Optics, Dec. 10, 2005, 44(35):7651-7658.

Hui et al., "Study on Fluorescence Spectra of B Vitamins," International Conference on Mechanics, Materials and Structural Engineering (ICMMSE 2016), 160-165.

Invitrogen, Phycobiliproteins, 2009, 6 pages.

Jeong et al., "Self-Assembling Nanospheres of Hydrophobized Pullulans in Water," Drug Development and Industrial Pharmacy, 1999, 25(8):917-927.

Ling et al., "Home Physical Therapy for Common Diseases," Heilongjiang Science and Technology Press, 1st Ed., Jan. 2002, 97-98, with English machine translation.

Machine translation of WO 2018004006A1, (Year: 2018) 28 pages.

Translation of Fukui et al. JP-2018065780-A. Published Apr. 26, 2018. Machine translation by Espacenet. Retrieved from https://worldwideespacenet.com/patent/search/famin/060786017/publication/JP2018065780A?q=pn%3DJP2018065780A (Year: 2018).

(56) References Cited

OTHER PUBLICATIONS

Translation of Yumiko et al. WO2017142057. Published Aug. 24, 2017. Human-assisted machine translation by STIC Translation Service Center provided to the USPTO. Provided on Sep. 12, 2024. (Year:2017).
Tsai et al., "Dispersion of Titanium Oxide Nanoparticles in Aqueous Solution with Anionic Stabilizer via Ultrasonic Wave," Journal of Nanoparticles, Nov. 24, 2016, vol. 2016; Article ID 6539581, 1-9.
Vinck et al., "Increased fibroblast proliferation induced by light emitting diode and low power laser irradiation," Lasers Med. Sci., 2003, 18:95-99.
Wang et al., "Photoprotection in the Era of Nanotechnology," Seminars in Cutaneous Medicine and Surgery, Dec. 2011, 30(4):210-213.

* cited by examiner

INFLAMMATION-SUPPRESSING AGENT

CROSS-REFERENCE TO RELATED APPLICATIONS

This application is the U.S. National Stage of PCT/JP2021/003391, filed Jan. 29, 2021, which claims priority to JP 2020-015815, filed Jan. 31, 2020.

FIELD

The present invention relates to an inflammation inhibiting agent comprising a wavelength conversion substance, to a composition and product comprising the inflammation inhibiting agent, and to a method for inhibiting inflammation in skin using the same.

BACKGROUND

The harm to skin caused by ultraviolet light includes adverse effects such as skin cancer, photoaging, skin spots, wrinkles and inflammation, which are also undesirable from the viewpoint of health and beauty.

Many measures are therefore being taken to protect the skin from ultraviolet light. Such measures include the use of sunscreens, the implementation of indoor spaces for avoidance of sunlight, and the use of head coverings and clothing treated to block UV rays and films designed to block UV rays.

CITATION LIST

Patent Literature

[PTL 1] Japanese Patent Publication No. 6424656
[PTL 2] Japanese Patent Publication No. 6361416
[PTL 3] International Patent Publication No. 2018/004006
[PTL 4] Japanese Unexamined Patent Publication No. 2018-131422
[PTL 5] Japanese Unexamined Patent Publication HEI No. 5-117127
[PTL 6] Japanese Patent Publication No. 4048420
[PTL 7] Japanese Patent Publication No. 4677250
[PTL 8] Japanese Patent Publication No. 3303942
[PTL 9] Japanese Unexamined Patent Publication No. 2017-88719
[PTL 10] International Patent Publication No. 2018/117117

SUMMARY

Technical Problem

It is an object of the present invention to provide a novel inflammation inhibiting agent that utilizes conversion of wavelength of ultraviolet light.

Solution to Problem

The present inventors have conducted active research with the aim of allowing ultraviolet light to be effectively utilized on skin. As a result, an inflammation inhibiting agent has been devised by finding that the expression of inflammatory substances is reduced by irradiating ultraviolet light to skin cells through wavelength conversion substance that converts ultraviolet light wave length.

The present application provides the present invention with the aspects set forth below.

(1) A inflammation inhibiting agent comprising a wavelength conversion substance as an active ingredient, wherein the wavelength conversion substance converts the wavelength of ultraviolet light contained in incident light to emit emission light having a wavelength longer than the wavelength of the ultraviolet light.

(2) The inflammation inhibiting agent according to (1), wherein the ultraviolet light has a peak wavelength between 200 nm and 400 nm.

(3) The inflammation inhibiting agent according to (1) or (2), wherein the emission light has a peak wavelength between 450 nm and 700 nm.

(4) The inflammation inhibiting agent according to any one of (1) to (3), wherein the wavelength conversion substance comprises one or more phycobiliproteins selected from among allophycocyanin, C-phycocyanin, R-phycocyanin, phycoerythrocyanin, B-phycoerythrin, b-phycoerythrin, C-phycoerythrin and R-phycoerythrin; one or more inorganic phosphors selected from among zinc oxide phosphors, magnesium titanate phosphors and calcium phosphate phosphors; one or more components selected from among vitamin A, $\beta$-carotene, vitamin K, vitamin B1, vitamin B2, vitamin B6, vitamin B12, folic acid, niacin, lycopene, gardenia, safflower, turmeric, cochineal, perilla, red cabbage, flavonoids, carotenoids, quinoids, porphyrins, anthocyanins, and polyphenols; and/or one or more pigments selected from among Red No. 401, Red No. 227, Red No. 504, Red No. 218, Orange No. 205P, Yellow No. 4, Yellow No. 5, Green No. 201, Pyranin Conch, Blue No. 1, 2,4-diaminophenoxyethanol hydrochloride, Arizulin Purple SS, Violet No. 401, Black No. 401, Helindone Pink, Yellow No. 401, Bentizine Yellow G, Blue No. 404, Red No. 104, and meta-aminophenol.

(5) The inflammation inhibiting agent according to (4), wherein the wavelength conversion substance comprises one or more phycobiliproteins selected from among allophycocyanin, C-phycocyanin, R-phycocyanin, phycoerythrocyanin, B-phycoerythrin, b-phycoerythrin, C-phycoerythrin and R-phycoerythrin; one or more inorganic phosphors selected from among zinc oxide phosphors, magnesium titanate phosphors and calcium phosphate phosphors; and/or one or more B vitamins selected from among vitamin B1, vitamin B2, vitamin B6 and vitamin B12.

(6) A composition comprising the inflammation inhibiting agent according to any one of (1) to (5).

(7) The composition according to (6), wherein the composition is a skin external composition for inhibiting inflammation in skin by exposing skin to light containing ultraviolet light.

(8) The composition according to (6) or (7), wherein the composition is directed to a composition for inhibiting, preventing, or treating erythema.

(9) A composition for inhibiting, preventing, or treating erythema comprising a wavelength conversion substance as an active ingredient, wherein the wavelength conversion substance converts the wavelength of ultraviolet light contained in incident light to emit emission light having a wavelength longer than the wavelength of the ultraviolet light.

(10) A cosmetic method for inhibiting inflammation of a subject, comprising:
applying the composition according to any one of (6) to (9) to skin of a subject, and
exposing the composition-applied skin with light containing ultraviolet light.
(11) A product comprising the inflammation inhibiting agent according to any one of (1) to (5) or the composition according to any one of (6)-(9).
(12) The product according to (11), wherein the product is for inhibiting inflammation in skin by exposing the skin to light passing through the product, which contains ultraviolet light.
(13) A cosmetic method for inhibiting inflammation in skin of a subject, comprising:
bringing light containing ultraviolet light through the product according to (11) or (12), and
exposing the skin of the subject to light passing through the product.
(14) A method for inhibiting, preventing or treating erythema in a subject suffering from erythema or in need of inhibiting or preventing erythema, comprising:
applying wavelength conversion substance to skin as an active ingredient, wherein the wavelength conversion substance converts the wavelength of ultraviolet light contained in incident light to emit emission light having a wavelength longer than the wavelength of the ultraviolet light.
(15) The method according to (14), further comprising irradiation of light which contains ultraviolet light at the skin after applying the wavelength conversion substance.
(16) A wavelength conversion substance for use in inhibiting, preventing or treating erythema by applying to skin, wherein the wavelength conversion substance converts the wavelength of ultraviolet light contained in incident light to emit emission light having a wavelength longer than the wavelength of the ultraviolet light.
(17) The wavelength conversion substance according to (16), wherein erythema is inhibited, prevented, or treated through the inhibition of inflammatory substances.
(18) Use of a wavelength conversion substance for the preparation of a composition for preparing a composition for inhibiting, preventing or treating erythema by applying to skin, wherein the wavelength conversion substance converts the wavelength of ultraviolet light contained in incident light to emit emission light having a wavelength longer than the wavelength of the ultraviolet light.
(19) Use according to (18), wherein erythema is inhibited, prevented, or treated through the inhibition of inflammatory substances.

Advantageous Effects of Invention

The present invention can inhibit inflammation in skin cells by effectively making use of ultraviolet light, and is based on the finding that inhibition of inflammation can results in a desirable effect on skin. Further, the invention can inhibit, prevent or treat erythema. The invention provides novel uses of the aforementioned compounds that have conventionally been used primarily as dyes, pigments, ultraviolet scattering agents, ultraviolet absorbers, nutrients and antioxidants. The invention also helps to improve quality of life by providing a more positive feeling for persons who have attempted to avoid ultraviolet light as much as possible for beauty or health reasons when outdoors.

DESCRIPTION OF EMBODIMENTS

Figure 1:
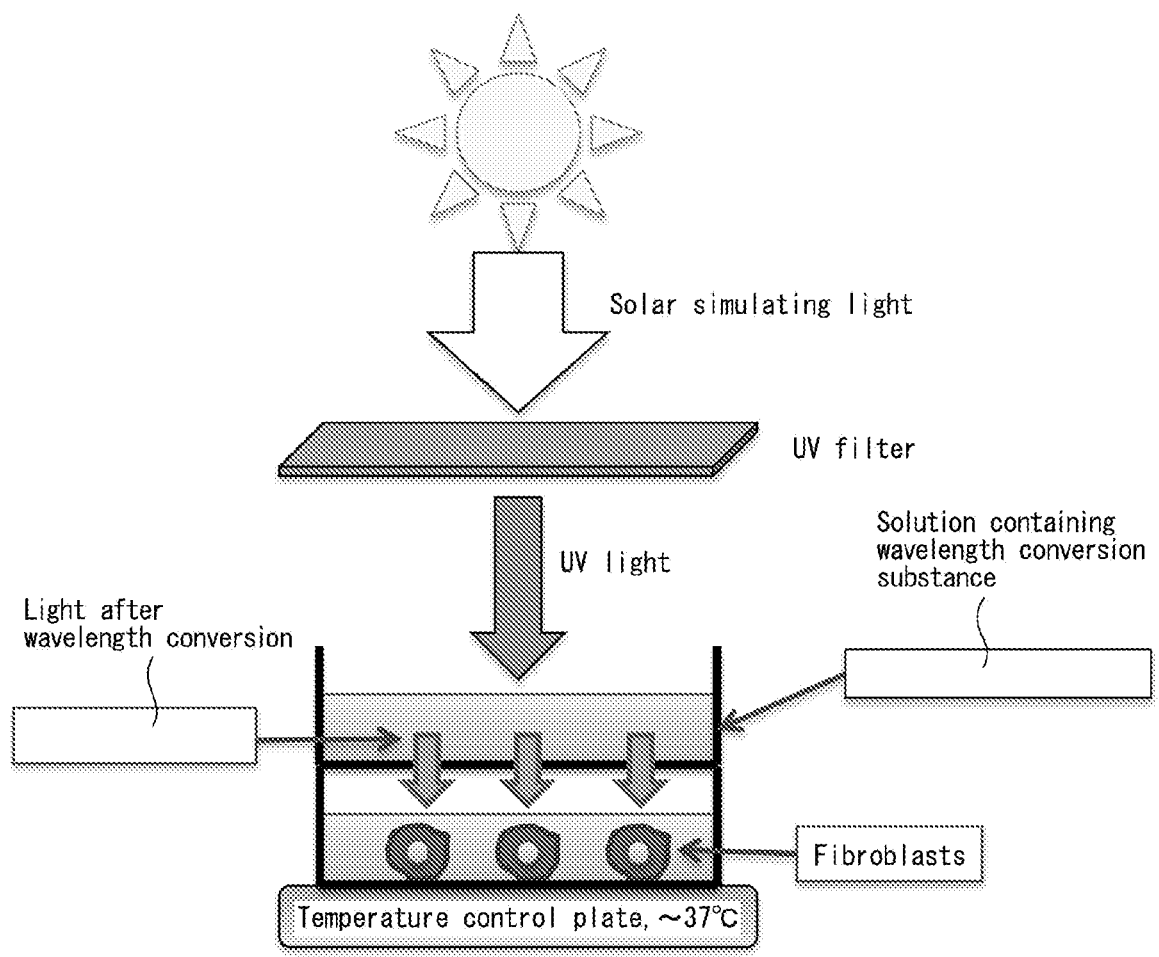
FIG. 1 is a schematic diagram illustrating Experiment 1.

The inflammation inhibiting agent of the invention comprises a wavelength conversion substance as an active ingredient. A wavelength conversion substance is a substance that converts the wavelength of ultraviolet light contained in incident light and emits emission light having a wavelength longer than the wavelength of the ultraviolet light.

The ultraviolet light may include UVA, UVB and UVC. According to one embodiment, the ultraviolet light is light with a peak wavelength of 200 nm to 400 nm. The ultraviolet light may also be included in incident light such as sunlight, for example. Alternatively, the incident light may be ultraviolet light, and artificially generated ultraviolet light may be used. Ultraviolet light can have various effects on the skin. As an example, ultraviolet light is known to cause sunburns, such as sunburn and suntan, and to cause DNA damage in cells. Further, ultraviolet light, especially UV-A, is known to have an effect on dermal layer to denature various proteins including collagen. Ultraviolet light, especially UV-B is known to cause inflammation.

The emission light emitted by the wavelength conversion substance has a longer wavelength than ultraviolet light, with a peak wavelength of preferably 450 nm to 700 nm. The emission light may have one or more peaks at 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm or 700 nm, or in any range within these values, though without being restrictive, or it may be red light, orange light, green light or blue light. According to one embodiment, the wavelength conversion substance has its main wavelength at 450 nm to 700 nm, for example 500 nm to 700 nm, for light emitted upon excitation with excitation light of 200 nm to 400 nm.

Examples of wavelength conversion substances include the following components: phycobiliproteins such as allophycocyanin, C-phycocyanin, R-phycocyanin, phycoerythrocyanin, B-phycoerythrin, b-phycoerythrin, C-phycoerythrin and R-phycoerythrin; natural or synthetic components such as vitamin A, β-carotene, vitamin K, vitamin B1, vitamin B2, vitamin B6, vitamin B12, folic acid, niacin, lycopene, gardenia, safflower, turmeric, cochineal, perilla, red cabbage, flavonoids, carotenoids, quinoids, porphyrins, anthocyanins, polyphenols, dyes such as Red No. 401, Red No. 227, Red No. 504, Red No. 218, Orange No. 205 P, Yellow No. 4, Yellow No. 5, Green No. 201, Pyranin Conch, Blue No. 1, 2,4-diaminophenoxyethanol hydrochloride, Arizulin Purple SS, Violet No. 401, Black No. 401, Helindone Pink, Yellow No. 401, Bentizine Yellow G, Blue No. 404, Red No. 104, meta-aminophenol; and phosphors obtained by fluorescent-doping of inorganic compounds, for example, blue phosphors comprising the amorphous silica particles mentioned in Japanese Patent No. 6424656, cerium and phosphorus and/or magnesium, and red phosphors comprising compounds obtained by europium activation of mixed crystals consisting of the alkaline earth metal sulfides described in Japanese Patent No. 6361416 combined with gallium compounds, the zinc oxide phosphors mentioned in International Patent Publication No. 2018/004006, the zinc oxide phosphors mentioned in Japanese Unexamined Patent Publication No. 2018-131422, and the inorganic phosphors mentioned in Japanese Unexamined Patent Publication HEI No. 5-117127. According to one embodiment, the inorganic phosphor is one or more phosphors selected from among phosphors obtained by doping zinc oxides represented by ZnO: Zn, $Zn_{1+z}$, $ZnO_{1-x}$ with the sulfur-containing compounds mentioned in International Patent Publication No. 2018/004006, including sulfides and/or sulfates such as zinc sulfide or zinc sulfate, magnesium titanate phosphors obtained by doping magnesium titanates such as $MgTiO_3$ or $Mg_2TiO_4$ with manganese, and calcium phosphate phosphors obtained by doping calcium phosphates such as $Ca(H_2PO_4)_2$, $CaHPO_4$ or $Ca_3(PO_4)_2$ with cerium.

The wavelength conversion substance may be obtained by extraction from a natural source such as an animal, plant or algae, or it may be obtained by an artificial method such as chemical synthesis. For example, phycobiliproteins can be prepared by extraction from algae, including blue-green algae such as *spirulina* (*Spirulina platensis*) or red algae such as porphyridiophylla (*Porphyridium purpureum*), by the method described in Japanese Patent No. 4048420, Japanese Patent No. 4677250 or Japanese Patent No. 3303942, for example. Zinc oxide phosphors can be produced by the method described in International Patent Publication No. 2018/004006, Japanese Unexamined Patent Publication No. 2018-131422 or Japanese Unexamined Patent Publication HEI No. 5-117127, for example. Magnesium titanate phosphors can be produced by the method described in Japanese Unexamined Patent Publication No. 2017-88719. Calcium phosphate phosphors can be produced by the method described in International Patent Publication No. 2018/117117.

So long as the wavelength conversion effect of the invention is not impaired, these wavelength conversion substances may be composed of, or may include, the components mentioned above, and they may be single components alone or combinations of more than one of the components. For example, the aforementioned phycobiliproteins or inorganic material phosphors may be mixed with other wavelength conversion substances such as B vitamins (vitamin B1, vitamin B2, vitamin B6 or vitamin B12) to exhibit synergistic effects. These components are merely examples, however, and any other substances that exhibit the wavelength conversion effect of the invention may be used.

The wavelength conversion substance content in the inflammation inhibiting agent, composition or product of the invention is not particularly restricted so long as the wavelength conversion effect of the invention is not impaired, and it may be appropriately determined for the type of wavelength conversion substance and the purpose of use of the inflammation inhibiting agent or composition. It may be any content in the range of 0.01 to 99.99 wt % or 0.1% to 999 wt %, for example.

When ultraviolet light is irradiated to the inflammatory inhibitors of the present invention, it emits emission light. The emission light can reduce the expression of inflammation-related proteins in skin cells. Inflammation-related proteins include inflammatory cytokines or chemokines. Such inflammatory substances include, as an example, at least one selected from interleukin 1α (IL-1α), interleukin 8 (IL-8), interleukin 6 (IL-6), tumor-necrosis factor α (TNF-α), and the like. The inflammation inhibiting agent of the present invention is capable of suppressing inflammation by absorbing ultraviolet light and emitting emission light. Inflammation may be ultraviolet light-induced inflammation caused by unabsorbed ultraviolet light, or may include originally occurring inflammation, such as dermatitis, atopic dermatitis, psoriasis, contact dermatitis, urticaria, etc. UV-induced inflammation may include sunburn. Sunburn is divided roughly into blackening (suntan) caused mainly by UV-A (wavelength 315 μm to 400 μm) and erythema and sunburn caused by UV-B (wavelength 280 μm to 315 μm).

Erythema refers to a condition with redness occurring on the skin surface due to dilation of capillary vessels, etc. Erythema is caused by various causes including infections, massage, allergy, sunburn, and radiation damage. Erythema can be distinguished from purpura and pigmentation by compressing and checking whether or not redness is disappeared. Erythema to be inhibited, prevented, or treated according to the present invention may be erythema of any cause, but is particularly ultraviolet-induced erythema.

IL-1α is one of inflammatory cytokines that relates to immune response, inflammatory response, and hematopoietic response. IL-1α acts by binding to interleukin-1 receptors to activate IL-1 receptor-associated kinases, thereby activating NF-κB and MAP-kinases involved in inflammatory responses.

Interleukin-8 (IL-8) is one of the chemokines produced by macrophages, epithelial cells, airway smooth muscle cells, vascular endothelial cells, etc. Interleukin 8 induces neutrophil and granulocyte chemotaxis and is involved in inflammation, especially in local inflammation.

Interleukin 6 (IL-6) is one of the cytokines contributing to hematopoiesis and inflammatory responses. IL-6 is produced by a variety of cells, including T cells, B cells, and macrophages. IL-6 induces signal transduction such as JAK-STAT pathway and MAP-kinase pathway by binding to IL-6 receptors.

Tumor necrosis factor-alpha (TNF-α) is one of the cytokines produced by macrophages, monocytes, T cells, NK cells, smooth muscle cells, adipocytes, etc. TNF-α is involved in infection defense and anti-tumor action by inducing apoptosis, producing inflammatory mediators (such as IL-1, IL-6) and enhancing antibody production through TNF receptor, and also is involved in various diseases caused by overexpression, such as rheumatoid arthritis, psoriasis, and involved in particularly inflammatory diseases.

Any form of administration may be used for the inflammation inhibiting agent and composition of the invention, but an external preparation for skin will often be preferred, such as a drug, quasi drug or cosmetic, for inhibiting inflammation in skin by exposing the skin to light containing ultraviolet light. When the inflammation inhibiting agent or composition of the invention is to be used as an external preparation for skin, the dosage form, coating method and number of doses may be determined as desired. For example, it may be applied onto skin in the form of cosmetic water or a spray, oil, cream, latex, gel, sunscreen or suntan lotion either periodically or irregularly, once or several times per day at morning, noon or evening, or before going out or engaging in outdoor activities, marine sports or skiing, for example, when exposure to sunlight is expected.

The inflammation inhibiting agent and composition of the invention may also be used in combination with an additive such as an excipient, preservative, thickener, binder, disintegrator, dispersing agent, stabilizer, gelling agent, antioxidant, surfactant, preservative, oil, powder, water, alcohol, thickener, chelating agent, silicone, antioxidant, humectant, aromatic, drug component, antiseptic agent, pH adjustor or neutralizer, selected as necessary or desired. It may also be used in combination with other inflammation inhibiting agents to increase the effect of the invention.

The present invention further provides products such as sun visors, caps, clothing, gloves, screen films, window sprays or creams, window materials or wall materials, for example, that comprise a inflammation inhibiting agent of the invention and are intended to inhibit inflammation in skin. The usage of additives in the products of the invention and the forms of the products may also be as desired.

The present invention further provides a method for producing the inflammation inhibiting agent, composition or product of the invention. A method for inhibiting inflammation in skin of a subject, or a method for inhibiting, preventing or treating erythema is also provided, the method comprising application of a inflammation inhibiting agent or composition of the invention onto the skin of a subject and exposing the skin to light containing ultraviolet light after application of the inflammation inhibiting agent or composition; or passing light containing ultraviolet light through the product of the invention, and exposing the skin to the transmitted light; wherein the inflammation inhibiting agent, composition or product converts the wavelength of ultraviolet light in the incident light and emits emission light with a longer wavelength than the wavelength of the ultraviolet light, transmitting the ultraviolet light with a peak wavelength of preferably 200 nm to 400 nm as light with a peak wavelength of 450 nm to 700 nm, for example 500 nm to 700 nm. The method for inhibiting inflammation in skin of a subject will often be for the purpose of beautifying, instead of treatment by a doctor or health care professional. The invention further provides a cosmetic counseling method for supporting cosmetology, which includes providing a cosmetic method, inflammation inhibiting agent, composition or product of the invention to a subject.

A method for inhibiting, preventing, or treating erythema comprises applying a wavelength-conversion substance as active ingredients to the skin in a subject suffering from erythema or in need of inhibiting or preventing erythema. The wavelength conversion substance applied to skin converts the wavelength of ultraviolet light contained in incident light to emit emission light having a wavelength longer than the wavelength of the ultraviolet light. Such emission light reduces the amount of inflammatory materials and can inhibit, prevent or treat erythema. A subject may suffer from erythema caused by any cause, particularly ultraviolet-induced erythema. A subject in need of inhibiting or preventing erythema require, as an example, inhibiting or preventing erythema caused by ultraviolet light, and may be a subject who wish to avoid erythema caused by sunburn or those who develop erythema caused by sunburn. A wavelength converting substance may be applied to the skin of such a subject, for cosmetic purposes. The wavelength conversion material may be formulated into sunscreens, basic cosmetics, make-up cosmetics, and the like to be applied to the skin

EXAMPLES

The present invention will now be explained in greater detail by examples. However, the invention is in no way limited by the examples.

Experiment 1: Change in Gene Expression by Applying Wavelength Conversion Substances Experiment 1-1: Preparation of Wavelength Conversion Substances Zinc oxide phosphor is used as a wavelength conversion substance, and is dispersed in alcohol to prepared 5% and 10% dispersions.

Lumate G by Sakai Chemical Industry Co., Ltd. was used as a zinc oxide phosphor.

Lumate G is a zinc oxide phosphor obtained by doping ZnO with a sulfur-containing compound and then firing as described in International Patent Publication No. 2018/004006, the absorption spectrum having a peak wavelength at 365 nm and the emission spectrum having a peak wavelength at 510 nm.

Experiment 1-2: Preparation of Cell Samples

Cell samples were prepared in the following manner.
1. Normal Human Epidermal Keratinocytes (PromoCell) were used. A cell suspension (1 mL) stored with liquid nitrogen was placed in a hot water bath (37° C.) and thawed until small ice pellets remained, and then diluted with 9 mL of warm KGM medium.
2. The diluted suspension was gently mixed and transferred to a T75 flask, and incubated overnight at 37° C.
3. On the following day, the medium was exchanged with 10 mL of fresh medium.
4. The medium was periodically exchanged (once every 2 to 3 days), while continuing growth of the cells. During this time, a microscope was used to observe the cells and to confirm that the cells had proliferated with the proper form.
5. Once the cells reached approximately 80% confluence, they were subcultured.
6. Subculturing of the cells was carried out by rinsing and aspirating once in 10 mL of warm PBS.
7. 5 mL of warm trypsin was added to the T75 flask to cover the bottom of the flask with the trypsin solution, and the mixture was aspirated after standing for 1 minute at room temperature.
8. The flask was set in an oven at 37° C. for 5 minutes (maximum) for keratinocytes. A microscope was used to observe the cells, confirming that they were small and elliptical.

9. The sides of the T75 flask were then lightly tapped to free the cells. A microscope was used to observe the cells and confirm that they were freely moving.
10. The keratinocytes were resuspended in 5 mL of warm trypsin neutralizing solution, and transferred to a sterilized 50 mL Falcon tube. The flask was further rinsed with 5 mL of warm FGM and added to the Falcon tube, to ensure transfer of all of the cells.
11. The cells were centrifuged at 10,000 rpm for 5 minutes (4° C.), and the supernatant was carefully removed while avoiding disturbing the cell pellet.
12. The keratinocytes were resuspended in KGM at a concentration of $4 \times 10^4$ cells/well (500 µL), and plated in collagen coated glass bottom 4-well chamber slide.
13. The medium was replaced every two or three days, and cells were proliferated until they reached 60 to 70% confluence (differing for the type of experiment).
14. At 24 hours before irradiation, the medium was changed to non-supplemented medium.

Experiment 1-3: Ultraviolet Light Irradiation

1. At least 30 minutes prior to irradiation, the power source of a solar simulator was activated to warm up the lamp. The solar simulator used was a UG11 filter. A UG11 filter is a filter that allows passage of UVB alone while cutting light of other wavelengths. The UV light passing through the UG11 filter had a peak wavelength of 300 nm to 385 nm.
2. The temperature control plate was turned on and set to 33° C.
3. The cells prepared in Experiment 1-2 were rinsed once with warm PBS.
4. A 0.5 mL portion of warmed Martinez solution (145 mM NaCl, 5.5 mM KCl, 1.2 mM $MgCl_2 \cdot 6H_2O$, 1.2 mM $NaH_2PO_4 \cdot 2H_2O$, 7.5 mM HEPES, 1 mM $CaCl_2$ and 10 mM D-glucose) was added to each well.
5. As shown in FIG. 1, the cell-containing wells were set on a plate, 0.4 ml of each solution containing the wavelength conversion substances prepared in Experiment 1-1 was injected into the wells of a 24-well plate, the cell-containing wells were placed over it in a manner covering the wells, and UV light was irradiated into the cell solution through the wavelength conversion substance solution without allowing direct contact between the wavelength conversion substance solution and the cell solution.
6. The irradiation was carried out to a total radiation dose of 100 $mJ/cm^2$. As controls, there were prepared a sample of the cells directly irradiated with UV light without setting a wavelength conversion substance plate on the cell-containing wells, and a sample of the cells cultured in a dark environment without irradiation of UV light.
7. After irradiation, the Martinez solution was exchanged with warmed KGM (supplement-free), and the plate was returned to the 37° C. incubator, and incubated for 24 hours.

Experiment 2: Microarray

Experiment 2-1: RNA Extraction

Cell samples incubated for 24 h after irradiating ultraviolet light in Experiments 1-3 were washed with 500 µl warm PBS, and PBS was completely aspirated. Qiagen RNeasy Mini Kit prep (Qiagen, 74106) were used to extract RNA according to the product instructions.

Experiment 2-2: Microarray

Microarray for Human gene-expression (SurePrint G3 Human GE Microarray 8×60K Ver. 3.0 (Agilent technology)) was used to perform the analysis of RNAs extracted in Experiment 2-1. The extracted RNA was subjected to labeling reactions, amplification reactions, purification, and quantitation of cRNA according to the protocol provided by Agilent Technology to prepare hybridization samples. Microarrays were observed with AGILINT C MICROARRAY SCANNER to identify genes whose expression was significantly reduced or increased by the presence or absence of wavelength-converting material. Gene expression of IL-1α and TNF-α, which are inflammation related genes is significantly reduced.

Experiment 3: RT-PCR

Experiment 3-1: RNA Extraction

1. The cell samples incubated for 24 h after UV irradiation in Experiments 1-3 was subjected to RNA extraction by using RNeasy Kit (Qiagen) in accordance with the product instructions to extract RNA.
2. Concentration and A260/280 were recorded for each sample.

Experiment 3-2: Reverse Transcription

1. SuperScript VILO cDNA Synthesis Kit was used in accordance with the product instructions, with 1 pg to 2.5 µg of RNA being added per container, and the PCR system was operated at a setting of at 25° C. for 10 min, at 42° C. for 60 min, at 85° C. for 5 min, and preservation at 4° C.

Experiments 3-3: RT-PCR

Figure 2:
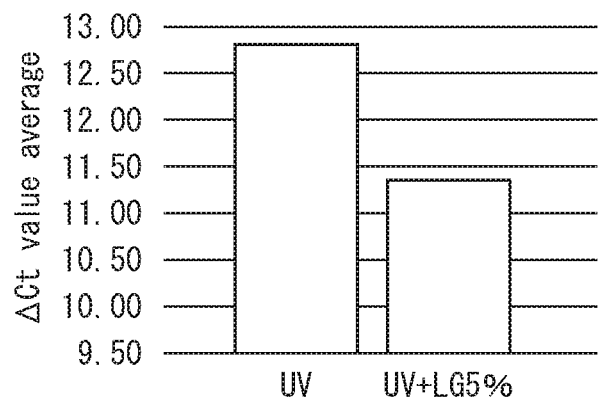
FIG. 2 shows changes in the expression levels of IL-8 in cultured cells when UV is irradiated along with using Lumate G as a wavelength conversion substance in Experiment 3. The vertical axis is the average of $\Delta$Ct values.
cellular activity during irradiation of UV using different wavelength conversion substances in Experiment 1. The ordinate represents relative fluorescence intensity (au).

The reverse-transcripted sample was diluted 50-fold with RNase free water, and a further 5-fold dilution series was prepared. Then, the reaction system described below was prepared and measured by a real-time PCR instrument (Applied Biosystems). ΔCt was determined based on the Ct value for IL-8 and the Ct value of the internal standard, GAPDH in the test sample (FIG. 2).

TABLE 1

| Reaction system | µl/well |
| --- | --- |
| unamplified diluted cDNA | 5 |
| Platinum Sybr green qPCR Super Mix-UDG | 12.5 |
| Primer mix (F/R) (5 µM) | 1 |
| ROX Reference Dye | 0.5 |
| RNase free water | 6 |
| Total | 25 |

TABLE 2

| Primer Name | Sequence | SEQ ID No. |
| --- | --- | --- |
| IL-8 Forward | TACCCCCTTGACTATTGACA | 1 |
| IL-8 Reverse | ATAACCATCTTTCAATACAG | 2 |

TABLE 2-continued

| Primer Name | Sequence | SEQ ID No. |
|---|---|---|
| GAPDH Forward | GAAGGTGAAGGTCGGAGTC | 3 |
| GAPDH Reverse | GAAGATGGTGATGGGATTTC | 4 |

Experiment 4. Determination of Protein Amount by ELISA

Experiment 4-1

Figure 3:
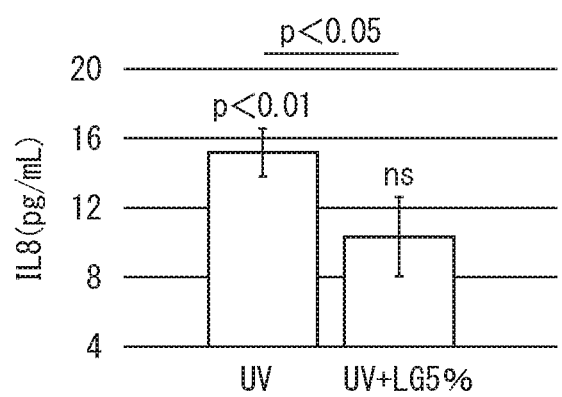
FIG. 3 shows changes in the protein amount (pg/µl) of IL-8 in culture supernatant when UV is irradiated along with using Lumate G as a wavelength conversion substance in Experiment 4. The vertical axis is the amount of IL-8 protein (pg/µl).

Culture supernatants were collected from cell samples incubated for 24 hours after UV irradiation in Experiment 1-3 and the amount of IL-8 protein in the culture supernatants were measured using a Quantikine HS Human IL-8 ELISA Kit (manufactured by R&D Systems Co., Ltd.) according to the product instructions (FIG. 3).

Experiment 4-2

Figure 4:
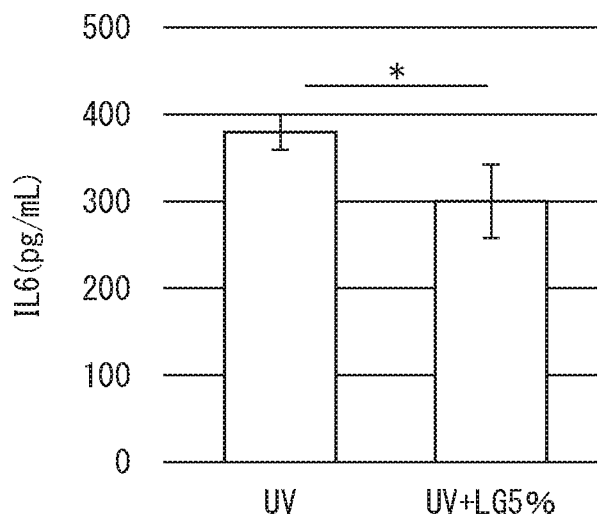
FIG. 4 shows changes in the protein amount of IL-6 in culture supernatant when UV is irradiated along with using Lumate G as a wavelength conversion substance in Experiment 4. The vertical axis is the amount of IL-6 protein (pg/µl).

Culture supernatants were collected from cell samples incubated for 24 hours after UV irradiation in Experiment 1-3, and the amount of IL-6 protein in the culture supernatants were measured using a Quantikine HS Human IL-6 ELISA Kit (manufactured by R&D Systems Co., Ltd.) according to the product instructions (FIG. 4). As a control, the culture supernatant obtained from the cell sample without UV irradiation and the culture supernatant obtained from the cell sample irradiated with UV without using a wavelength-conversion substance (Lumate G) were used.

Experiment 4-3

Figure 5:
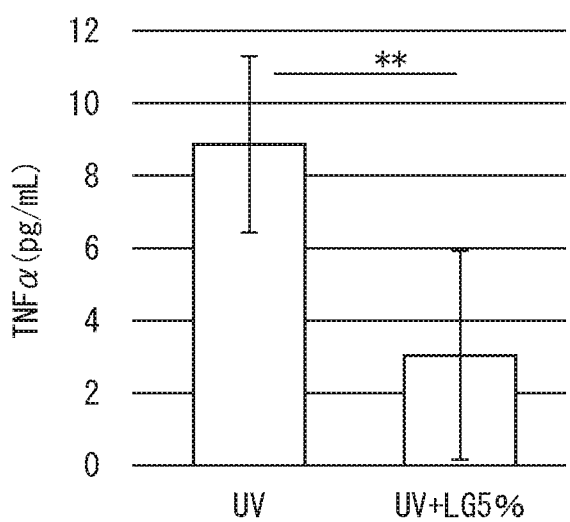
FIG. 5 shows changes in the protein amount of TNF-α in culture supernatant when UV is irradiated along with using Lumate G as a wavelength conversion substance in Experiment 4. The vertical axis is the amount of TNF-α protein (pg/µl).

Culture supernatants were collected from cell samples incubated for 24 hours after UV irradiation in Experiment 1-3, and the amount of TNF-α protein in the culture supernatants were measured using a Quantikine HS Human TNF-α ELISA Kit (manufactured by R&D Systems Co., Ltd.) according to the product instructions (FIG. 5). As a control, the culture supernatant obtained from the cell sample without UV irradiation was used. As a control, the culture supernatant obtained from the cell sample irradiated with UV without using a wavelength-conversion substance (Lumate G) were used These results indicate that UV-irradiation against wavelength-conversion substances reduces the protein amount of all of the inflammatory substances consisting of IL-8, IL-6, and TNF-α, and is effective in inhibiting inflammation. When the inflammation is suppressed in the cells of e skin, prevention and improvement of wrinkles, blemishes, skin aging, photoaging, erythema, etc. are expected.

Experiment 5: Suppress of Erythema by Wavelength-Conversion Substances

In the backs of 15 male subjects, several test sites having 1 centimeters square were marked, and the intensities of UV-B were determined among 20 mJ, 25 mJ, 30 mJ, 36 mJ, 43 mJ, 52 mJ, 62 mJ, 75 mJ and 90 mJ depending on the subjects' statement. Subjects who were reported to be susceptible to sunburn received UV-B at eight levels of intensity of 20 mJ to 75 mJ, and subjects who were reported to be not susceptible to sunburn received UV-B at eight levels of intensity of 25 mJ to 90 mJ (Day 0). 24 hours later, the subject's erythema was observed at each test site, and the minimum erythema dose (MED) for each subject was visually determined. The back was wiped with a non-alcohol wet tissue and allowed to acclimate to ambient environment (23° C. humidity 45%) for 15 min. The subject's back was photographed with two new marks on the test site having approximately 2 centimeters square. A spectrophotometric colorimeter (CM700d) was used to determine the color the reddish Aa for the marked test sites. Each subject was subjected to UV-B irradiation with a distance to the light source of 60 cm and with setting the intensity to be 1.2 MED for each subject, UV-B was then irradiated with setting at 0.34 W for 30 min (day 1) via a film coated with 5% of fluorescent zinc oxide (ZnO) on one side.

The back was wiped with a non-alcohol wet tissue for 24 h and allowed to acclimate to ambient environment (23° C. humidity 45%) for 15 min. Photographs were taken for the test sites marked on day 1. A spectrophotometer (CM700d) was used to determine color of redness Aa with a color contrast meter (Day 2).

Figure 6:
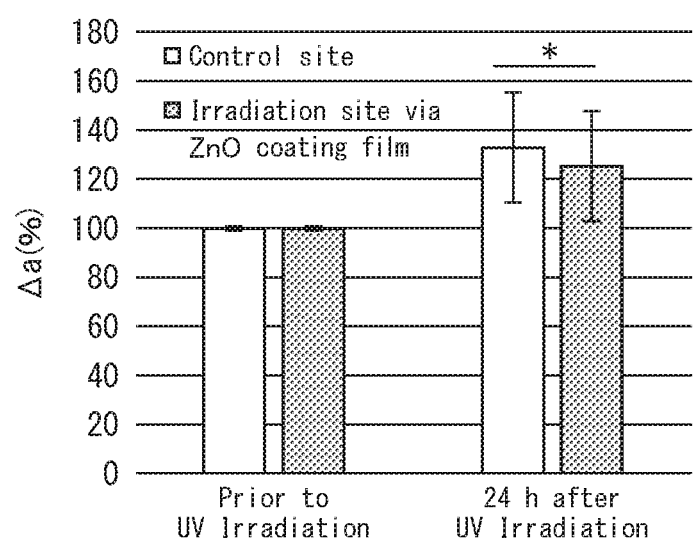
FIG. 6 shows degrees of erythema in UV irradiated skin when UV is irradiated along with using Lumate G as a wavelength conversion substance in Experiment 5.

Redness (Δa) determined in the spectrophotometer prior to UV-B irradiation on day 1 and redness (Δa) determined on day 2 were determined and graphed, respectively, for test sites irradiated with UV-B via a film coated with 5% fluorescent zinc oxide (ZnO) or not via said film (FIG. 6). Redness Aa at the site irradiated with UV-B without passing through the films was taken as the redness of the control site. UV-B irradiation via the film significantly reduced redness (Δa) (p<0.05: Wilcoxon Signed-rank test). These results indicate that UV irradiation via wavelength-conversion substances reduces inflammation, especially erythema. Accordingly, such wavelength conversion substances can be used as anti-inflammatory agents or a compositions for inhibiting, preventing, or treating erythema.

The embodiments of the invention described above are not intended to place limitations on the invention, and various modifications including cosmetics and drug compositions may be incorporated, which fall within the gist of the invention.

SEQUENCE LISTING

The invention claimed is:

1. A method for inhibiting inflammation in skin of a subject who needs to inhibit inflammation, comprising:
applying a wavelength conversion substance as an active ingredient,
wherein the wavelength conversion substance converts the wavelength of ultraviolet light contained in incident light to emit emission light having a wavelength longer than the wavelength of the ultraviolet light, wherein the wavelength conversion substance comprises zinc oxide phosphors emitting light having a peak wavelength between 450 nm and 570 nm.

2. The method according to claim 1, wherein the ultraviolet light has a peak wavelength between 200 nm and 400 nm.

3. The method according to claim 1, wherein the wavelength conversion substance is applied as a composition for inhibiting inflammation.

4. The method according to claim 1, further comprising exposing the skin to light containing ultraviolet light.

5. The method according to claim 1, wherein the subject suffers from erythema.

6. A method for inhibiting, preventing, or treating erythema comprising: applying a wavelength conversion substance to skin of a subject who is suffering from erythema as an active ingredient, wherein the wavelength conversion substance converts the wavelength of ultraviolet light contained in incident light to emit emission light having a wavelength longer than the wavelength of the ultraviolet light, wherein the wavelength conversion substance comprises zinc oxide phosphors emitting light having a peak wavelength between 450 nm and 570 nm.

7. A cosmetic method for inhibiting inflammation of a subject, comprising:
applying a wavelength conversion substance to skin of a subject, and
exposing the composition-applied skin with light containing ultraviolet light, wherein the wavelength conversion substance comprises zinc oxide phosphors emitting light having a peak wavelength between 450 nm and 570 nm.

8. The method according to claim 6, wherein the ultraviolet light has a peak wavelength between 200 nm and 400 nm.

9. The method according to claim 6, further comprising exposing the skin to light containing ultraviolet light.

10. The method according to claim 7, wherein the ultraviolet light has a peak wavelength between 200 nm and 400 nm.

11. The method according to claim 7, further comprising exposing the skin to light containing ultraviolet light.

* * * * *

SEQUENCE LISTING

<160> NUMBER OF SEQ ID NOS: 4

<210> SEQ ID NO 1
<211> LENGTH: 20
<212> TYPE: DNA
<213> ORGANISM: Artificial Sequence
<220> FEATURE:
<223> OTHER INFORMATION: Primer

```
<400> SEQUENCE: 1 taccccttg actattgaca                                                    20

<210> SEQ ID NO 2
<211> LENGTH: 20
<212> TYPE: DNA
<213> ORGANISM: Artificial Sequence
<220> FEATURE:
<223> OTHER INFORMATION: Primer

<400> SEQUENCE: 2
ataaccatct ttcaatacag                                                   20

<210> SEQ ID NO 3
<211> LENGTH: 19
<212> TYPE: DNA
<213> ORGANISM: Artificial Sequence
<220> FEATURE:
<223> OTHER INFORMATION: Primer

<400> SEQUENCE: 3
gaaggtgaag gtcggagtc                                                    19

<210> SEQ ID NO 4
<211> LENGTH: 20
<212> TYPE: DNA
<213> ORGANISM: Artificial Sequence
<220> FEATURE:
<223> OTHER INFORMATION: Primer

<400> SEQUENCE: 4
gaagatggtg atgggatttc                                                   20
```